United States Patent [19]

Okatani

[11] Patent Number: 4,866,540
[45] Date of Patent: Sep. 12, 1989

[54] REPRODUCTION METHOD FOR A DISK PLAYER

[75] Inventor: Masanao Okatani, Tokyo, Japan

[73] Assignee: Pioneer Electronic Corporation, Tokyo, Japan

[21] Appl. No.: 135,415

[22] Filed: Dec. 21, 1987

[30] Foreign Application Priority Data

Dec. 19, 1986 [JP] Japan .................. 61-303210

[51] Int. Cl.$^4$ .................................. H04N 5/85
[52] U.S. Cl. .................................. 358/342
[58] Field of Search .......... 358/342; 369/275, 111, 369/44–46, 32

[56] References Cited

U.S. PATENT DOCUMENTS

| | | | |
|---|---|---|---|
| 4,142,209 | 2/1979 | Hedlund et al. | 358/342 |
| 4,660,100 | 4/1987 | Sugiyama et al. | 358/341 |
| 4,672,472 | 6/1987 | Sugiyama et al. | 358/341 |
| 4,701,897 | 10/1987 | Nakagawa | 358/907 |

Primary Examiner—Donald McElheny, Jr.
Attorney, Agent, or Firm—Sughrue, Mion, Zinn, Macpeak & Seas

[57] ABSTRACT

A reproduction method for a digital disk player capable of playing both a standard compact disk containing only audio information and a composite disk having a first region containing only audio information and a second region containing both audio information and video information. The difference value between a present address as extracted from the information read from the disk and an expected address is continuously monitored. If the difference exceeds a prescribed value, it is judged that the reading spot of the pickup has jumped tracks. The beam is then moved back toward the expected address until the present address agrees with the expected address.

3 Claims, 5 Drawing Sheets

REPRODUCTION METHOD FOR A DISK PLAYER

BACKGROUND OF THE INVENTION

The present invention relates to a method of reproduction in a disk playing apparatus.

A small digital audio disk having a diameter of about 12 cm and called a "compact" disk is well known as an information storage medium on which a digital signal is recorded.

Recently, a disk (which is hereinafter referred to as a "composite" disk), which has the same size as a compact audio disk and on which a PCM (pulse code modulation) signal and a frequency-modulated video signal are recorded in a mutually superposed state, has been developed. As shown in FIG. 1, the composite disk has a first region 1a, here termed a CD region, which is an inner region and in which an audio signal subjected to PC is recorded, and a second region 1b, called a video region, which is an outer region and in which a frequency-modulated video signal and an audio signal subjected to PCM are recorded in a superposed state.

Since the video signal contains components whose frequency is higher than that of the audio signal, the frequency spectrum of the signals recorded in the video region 1b is as shown in FIG. 2, in which A denotes the PCM modulated audio signal and B denotes the frequency-modulated video signal. Due to the difference in signal frequency content between the region A and B, the rotational speed of the composite disk must be made higher at the time of recording of the video signal in the video region 1b than at the time of recording of the audio signal in the CD region 1a, and hence the rotational speed of the composite disk must also be made higher during reproduction of the video signal from the video region 1b than during reproduction of the audio signal from the CD region 1a. (See FIG. 3.) The speed of the composite disk for the recording and reproduction of the audio signal in and from the CD region 1a is several hundred rpm, while that of the composite disk for the recording and reproduction of the video signal in and from the video region 1b is typically more than two thousand rpm for the innermost portion of the region and more than one thousand rpm for the outermost portion thereof.

In a disk player for such a compact or composite disk, the information detecting point of a pickup follows the recording track of the disk to read recorded information therefrom. However, if external vibration acts on the player, the information detecting point of the pickup can be caused to jump recording tracks, resulting in making the reproduction of the disk unstable. Compact disk players have heretofore been adapted for use in motor vehicles, and it is desired to do the same for a composite disk player because the size of the composite disk reproducer is as small as that of the compact disk player. However, since a moving motor vehicle always vibrates to some extent, countermeasures need to be taken to prevent the information detecting point of the pickup of the composite disk reproducer from jumping the recording track of the composite disk due to such vibration.

SUMMARY OF THE INVENTION

The present invention was made in consideration of the above mentioned circumstances.

Specifically, it is an object of the present invention to provide a reproduction method for a disk player wherein reproduction that is resistant and stable against external vibration acting on the player is attained.

Satisfying this and other objects, the inventive reproduction method is characterized in that the difference between a present address detected from reproduced information and an expected address renewed at a prescribed period is monitored, and if the difference reaches or exceeds a prescribed value, the information detecting point of the pickup is judged to have jumped the recording track of the disk, whereupon the information detecting point is moved to the expected address corresponding to a last address read during the reproduction of CD the region of the disk, or is moved to a last address read during the reproduction of the video region of the disk.

DESCRIPTION OF THE PREFERRED EMBODIMENT

Preferred embodiments of the present invention will hereafter be described in detail with reference to the attached drawings.

Figure 4:
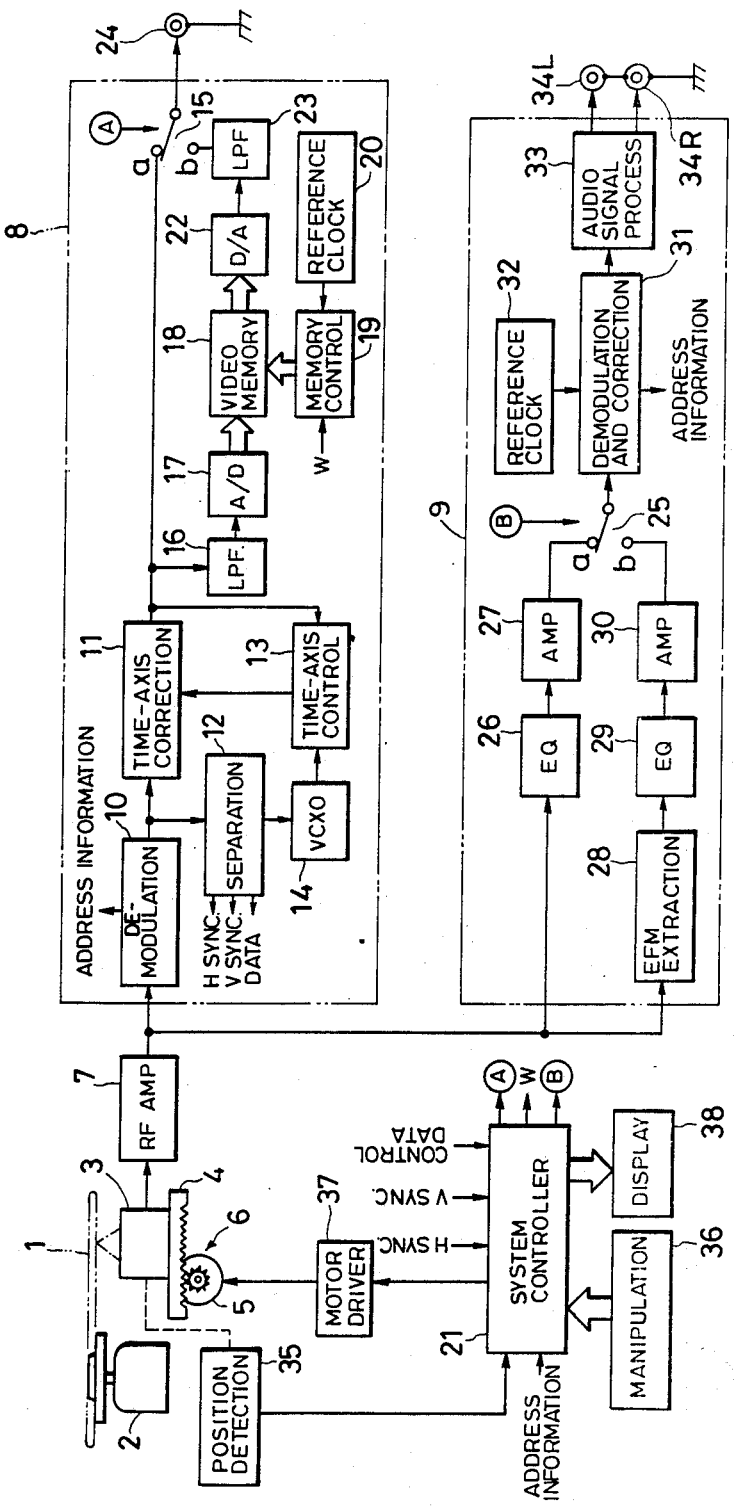
FIG. 4 shows diagrammatically an example of a disk player to which a reproduction method of the present invention is applied.

FIG. 4 shows diagrammatically a disk player to which a reproduction method of the invention is applied. A disk 1 is rotated by a spindle motor 2, and recorded information is read from the rotating disk through an optical pickup 3 on which is provided an optical system including a laser diode, an objective lens and a photosensor, a focusing actuator for driving the objective lens in the direction of the optical axis relative to the information recording surface of the disk 1, a tracking actuator which functions so that the information detecting spot of a beam emitted from the pickup 3 is moved in the radial direction of the disk relative to the recording track, and other necessary components. The pickup 3 is borne by a slider 4 movable in the radial direction of the disk 1. The slider 4 is straightly driven by a slider motor 5 through a transmission mechanism 6 composed of a rack and pinion or the like.

The output RF (radio frequency) information containing signal from the pickup 3 is supplied to a video information demodulation system 8 and a digital information demodulation system 9 through an RF amplifier 7.

In the video information demodulation system 8, the RF signal from the RF amplifier 7 is demodulated into a video signal by a demodulation circuit 10. The video signal is supplied to a time-axis correction circuit 11 and a separation circuit 12. In the demodulation circuit 10, address information included in the demodulated video information is detected. In the separation circuit 12, a horizontal (H) synchronizing signal, a vertical (V) synchronizing signal, and control data included in the video signal are extracted. The time-axis correction circuit 11 is implemented with a variable delay element such as a chargecoupled device. The amount of delay imposed by the element is altered depending on a control signal from a time-axis control circuit 13 to perform time-axis correction. The time-axis control circuit 13 produces the control signal in dependence on the phase differences between the oscillation output from a quartz oscillator 14, which oscillates synchronously with the horizontal synchronizing signal extracted by the separation circuit 12, and a signal produced by frequency division of the oscillation output, and the horizontal synchronizing signal and a color burst signal included in the video signal processed through the time-axis correction circuit 11. The constitution of the time-axis control circuit 13 is described in the Japanese Unexamined Published Patent Application No. 102182/81, for example.

The video signal subjected to time-axis correction is supplied as one input to a selection switch 15, and also to an A/D (analog/digital) converter 17 through a low-pass filter 16. The A/D converter 17 samples the video signal at a prescribed period and converts the resulting sampled values sequentially into digital data. The output digital data from the A/D converter 17 are supplied to a video memory 18 composed of a RAM (random access memory) or the like and which is capable of storing an amount of video information for at least one field. Address and mode control for the video memory 18 are performed by a memory control circuit 19. The memory control circuit 19 functions so that the data written at the various addresses in the video memory 18 are sequentially read therefrom in accordance with a clock signal from a reference clock signal generator circuit 20, and the contents of the memory 18 are rewritten in response to a write enable signal from a system controller 21 (described below).

The data read from the video memory 18 are converted into an analog signal by a D/A (digital/analog) converter 22. The analog signal is supplied as another input to the selection switch 15 through a low-pass filter 23. The selection switch 15 is normally in a position a so that the video signal directly supplied from the time-axis correction circuit 11 is applied to a video output terminal 24. The selection switch 15 is shifted into another position b in response to a changeover command from the system controller 21 so that the video signal from the video memory 18 is selectively supplied to the video output terminal 24.

The digital information demodulation system 9 has a selection switch 25, the position of which is set depending on which of the CD region and video region of a composite disk is being reproduced. The selection switch 25 is in a position a when the CD region is being reproduced and in a second position b when the video region is being reproduced. The selection switch 25 is shifted between the position a and b in response to a changeover command from the system controller 21.

Figure 1:
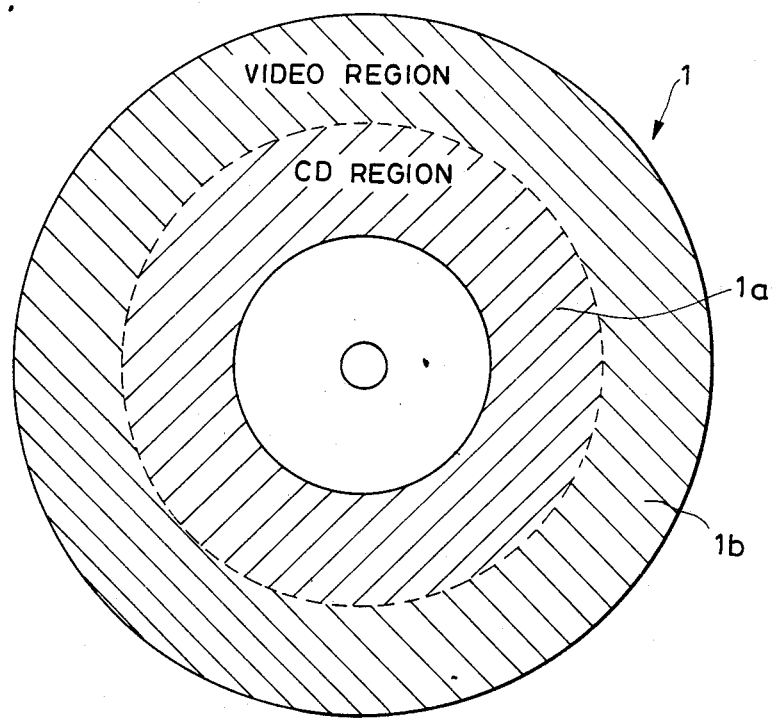
FIG. 1 shows the divisions of the recording area of a composite disk.
Figure 2:
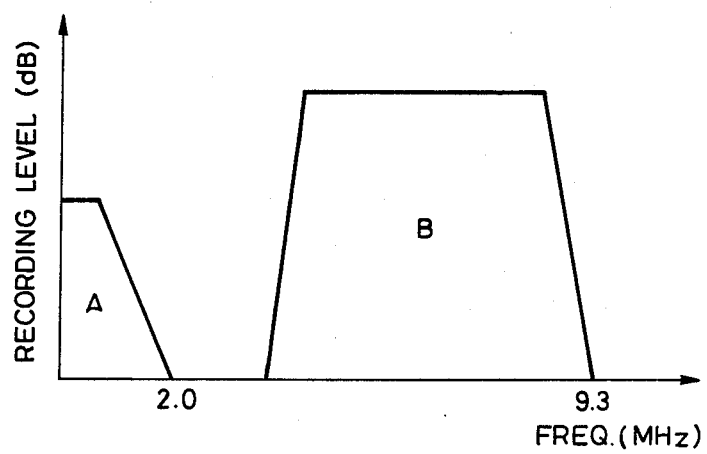
FIG. 2 shows the frequency spectrum of signals recorded in the video region of the composite disk.
Figure 3:
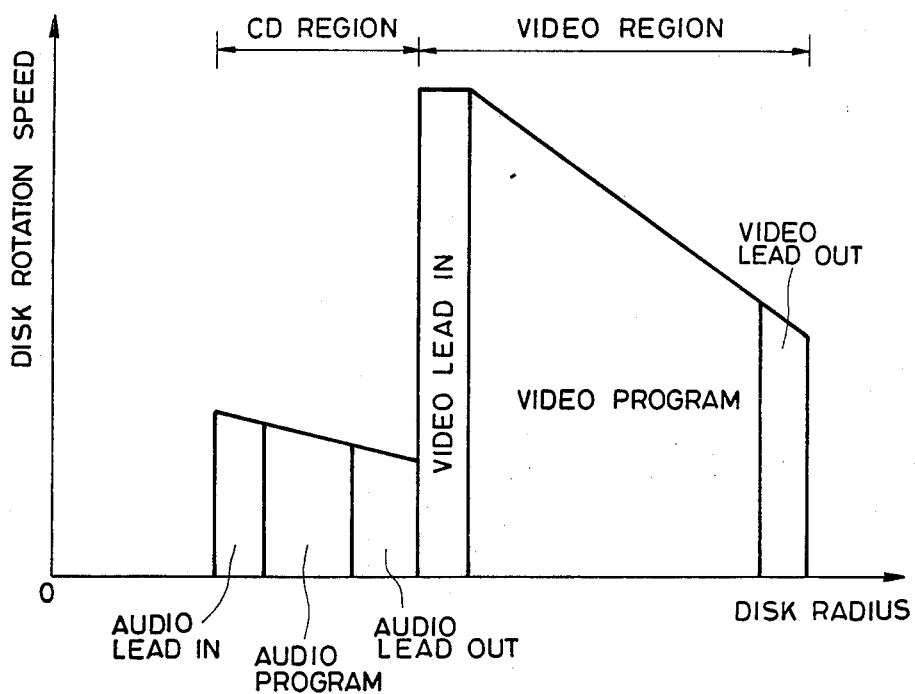
FIG. 3 shows the divisions of the information recording area of the composite disk.

As discussed above, there is a very large difference between the rotational speeds of a composite disk for reproduction of the CD region and for reproduction of the video region. Since a PCM audio signal is an EFM (eight-to-fourteen modulation) signal, for example, the EFM signal would adversely affect the low-frequency component of the frequency-modulated video signal if the EFM signal were directly superposed on the frequency-modulated video signal during the recording of the video region. For that reason, the EFM signal and the frequency-modulated video signal are recorded in the video region with the EFM signal and the frequency-modulated video signal having about the same degree of modulation but with the level of the EFM signal being lower by scores of decibels than that of the carrier of the frequency-modulated video signal (refer to FIG. 2). As a result, the same EFM signal differs in frequency characteristic and amplitude between the reproduction of the CD region and of the video region. Therefore, the reproduced EFM signal processing system must be switched over between reproduction of the EFM signal for the CD region and of the EFM signal from the video region so as to commonly use the digital information demodulation system 9.

During the reproduction of the CD region, the reproduced RF signal is the EFM signal, the frequency characteristic of which is compensated by an equalizer circuit 26 having a prescribed equalizing property and then amplified by a prescribed gain by an amplifier 27.

During the reproduction of the video region, only the EFM signal included with the frequency-modulated video signal in the reproduced RF signal is extracted by an EFM signal extraction circuit 28, which is implemented with a low-pass filter or the like. The frequency characteristic of the extracted EFM signal is compensated by an equalizer circuit 29 having an equalizing property different from that of the equalizer circuit 26. The EFM signal is then amplified by an amplifier 30 at a gain greater than that of the amplifier 27. As a result, an EFM signal equal in frequency characteristic and amplitude to that produced during the reproduction of the CD region is provided.

For reproduction of a compact disk, the selection switch 25 is always in the position a.

The reproduced EFM signal chosen by the selection switch 25 is supplied to a demodulation and correction circuit 31, which performs EFM demodulation of the EFM signal and then writes the signal into a memory such as a RAM. The demodulation and correction circuit 31 also controls the memory on the basis of a clock signal from a reference clock signal generator 32 to perform de-interleaving and correction of errors, the latter with the use of a parity detecting technique. Also, the circuit 31 detects address information. The digital audio signal demodulated and corrected by the demodulation and correction circuit 31 is processed by an audio signal processing circuit 33 composed of a D/A converter, a deglitcher circuit, etc., and then supplied to audio output terminals 34R and 34L for respective right and left channels.

A position detector 35 is provided near the path of movement of the pickup 3 in the radial direction of the disk 1 so as to detect when the beam spot produced by the pickup has reached a position corresponding to the boundary between the CD region and video region of the composite disk. The position detector 35 generates a detection signal indicative of such detection. The presence of the detection signal indicates that the pickup 3 has reached the video region. The position detector 35 may be made of an optical sensor or the like. The detection signal generated by the position detector 35 is supplied to the system controller 21.

The system controller 21 is implemented with a microcomputer including a CPU (central processing unit), a ROM (read-only memory), a RAM, etc. The system controller 21 is also supplied with the horizontal and vertical synchronizing signals and the control data from the separation circuit 12, a frame synchronizing signal from the demodulation and correction circuit 31, and a disk type information signal indicating whether the disk to be reproduced is a compact disk or a composite disk, mode setting information indicating whether only the CD region, only the video region or both the CD region and the video region are to be reproduced in the case of a composite disk, and other necessary signals from a manipulating section 36. In the system controller 21, the CPU processes the input signals in accordance with a program previously stored in the ROM to regulate various elements such as the selection switches 15 and 25, the memory control circuit 19, a drive circuit (not shown) for driving the spindle motor 2, a drive circuit 37 for driving the slider motor 5, and a display section 38, and to monitor the difference between a present address determined from the address information received from the demodulation circuit 10 or the demodulation and correction circuit 31 and an expected address, which is renewed at a prescribed period during the reproduction of the disk.

Figure 5:
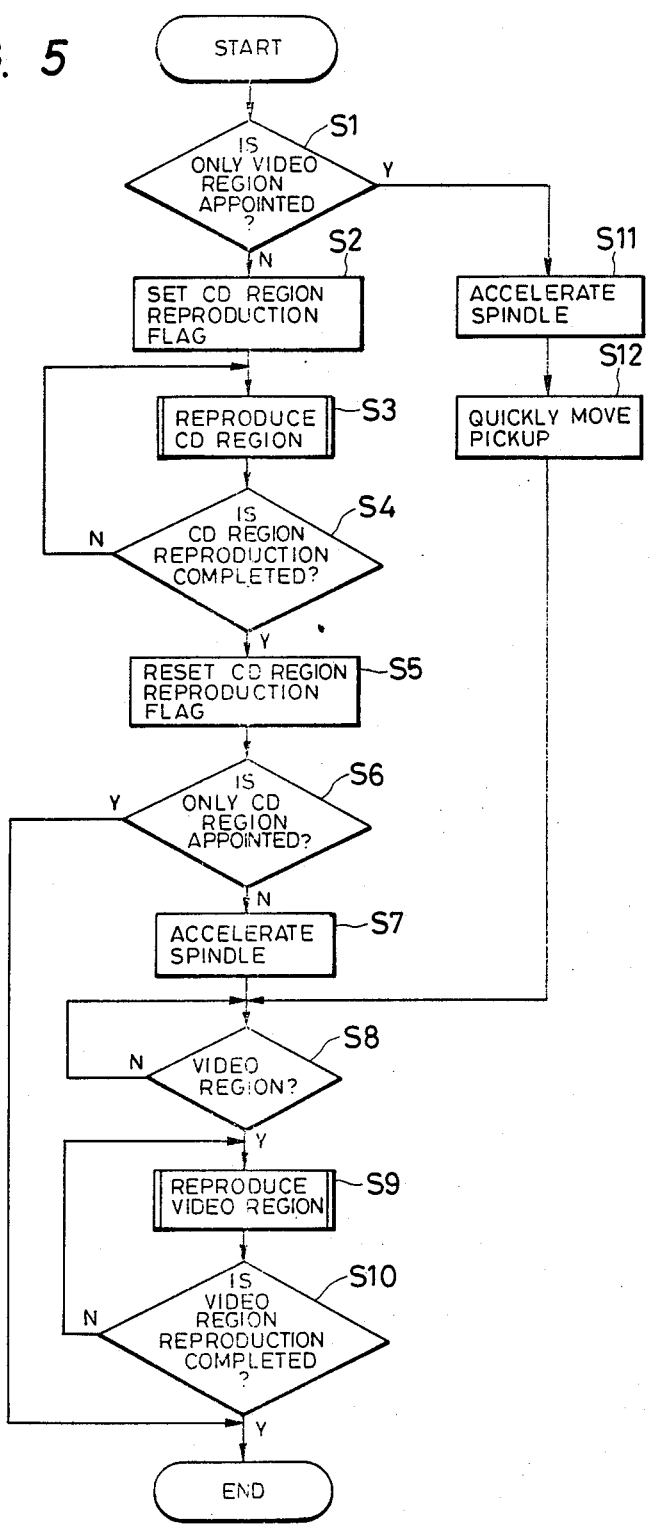
FIGS. 5 and 6 are flowcharts showing steps of the inventive reproduction method carried out by a CPU.

The steps of the reproduction method effected by the CPU of the system controller 21 in reproducing a composite disk with the disk player of the above-described constitution will now be described with reference to flowcharts shown in FIGS. 5 and 6.

A subroutine for controlling the reproduction will first be described with reference to the flowchart shown in FIG. 5. It is previously designated through the manipulating section 36 which of the regions of the composite disk is to be reproduced. On the basis of the mode indicating information supplied from the manipulating section 36, indicating whether only the CD region, only the video region or both the CD region and the video region are to be reproduced, it is judged in a step 1 whether or not only the video region is to be reproduced. When it is judged in the step S1 that not only the video region is reproduced, a CD region reproduction flag is set in a step S2, and reproduction of the CD region is then started in a step S3. When it is detected in a step S4 that the reproduction of the CD region has been completed, the CD region reproduction flag is reset in a step S5. Subsequently, it is judged on the basis of the previously entered mode indicating information in a step S6 whether or not only the CD region is to be reproduced. When it is judged in the step S6 that only the CD region is to be reproduced, reproducing operations are terminated. When only the CD region is to be reproduced, operations such as search, scanning, programmed reproduction and repetition can be performed as desired.

When it is judged in the step S6 that not only the CD region is to be reproduced, that is, that both the CD region and the video region are to be reproduced, the spindle motor 2 is accelerated to the prescribed maximum rotational speed for the video region in a step S7, and thereafter it is detected from the output from the position detector 35 in a step S8 when the beam spot (information detecting point) of the pickup 3 has reached the video region. Reproduction of the video region is then started in a step S9. When it is found in a step S10 that the reproduction of the video region has been completed, normal reproduction of both the CD region and the video region has been completed. When both the CD region and the video region are to be reproduced, operations such as search, scanning, programmed reproduction and repetition within only the CD region or only the video region, operations such as search from the CD region to the video region or from the video region to the CD region, and operations such as repetition through both the CD region and the video region can be performed.

When it is judged in the step S1 that only the video region is to be reproduced, the spindle motor 2 is accelerated to the prescribed maximum rotational speed for the video region in a step S11, and the slider motor 5 is rapidly rotated to quickly move the pickup 3 to the video region in a step S12. Subsequently, the step 8 is executed. When only the video region is to be reproduced, operations such as search, scanning, programmed reproduction and repetition within only the video region can be performed.

During the above-described reproduction of each of the CD region and the video region, preferred countermeasures need to be taken in the case of jumping of the recording track due to the external vibration, a defect on the disk or the like.

Figure 6:
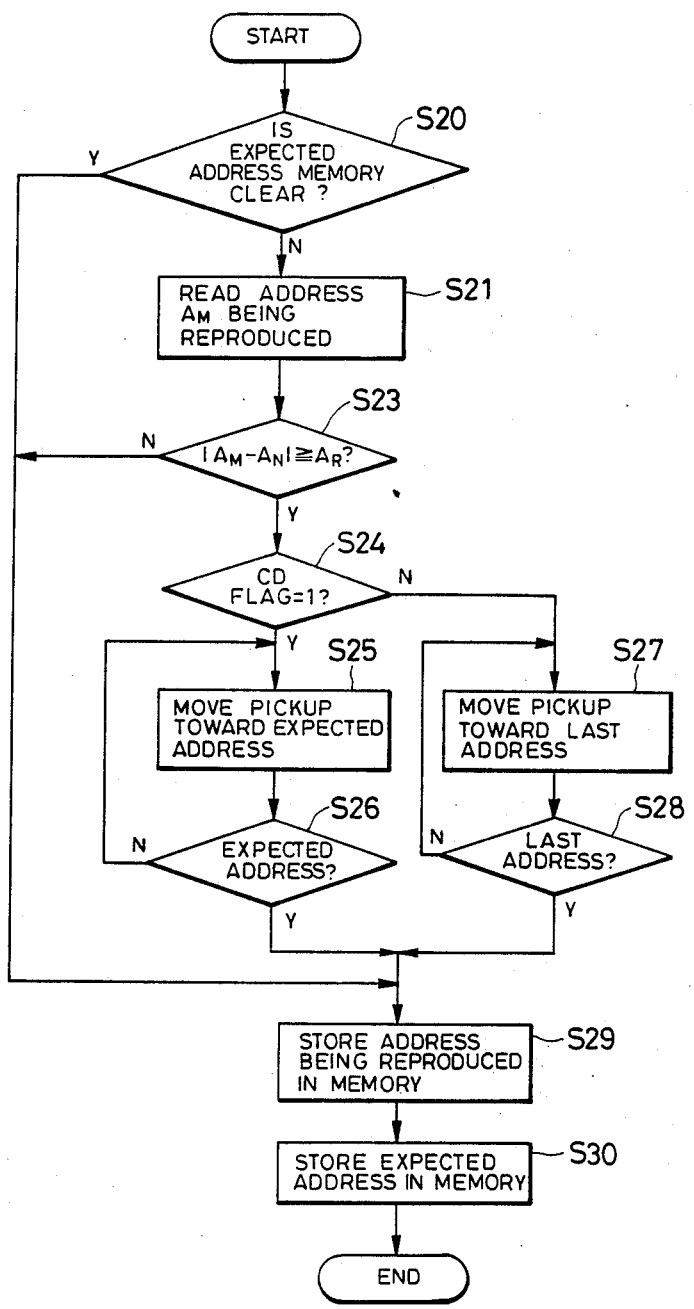

FIG. 6 is a flowchart showing steps of a method for detecting the jumping of the recording track and a correction method. The flowchart shown in FIG. 6 is executed as a subroutine during the reproduction of each of the CD region and video region, for example, at a predetermined period by timer interruption.

First, in a step 20, referring to the contents stored in an area designated as an expected address area in the RAM of the system controller 21, if the expected address memory has previously been cleared, the address being reproduced is written in a step 29 as a last address in an area designated as a present address memory in the RAM, and subsequently the expected address AN is written in a step 30 in the expected address area, whereupon the first execution of the subroutine is terminated. The "expected address" is used for predicting an address which will be detected after a predetermined time, that is, after the lapse of the above-mentioned predetermined period defined by a timer interrupt. The value of the expected address will of course be a value larger than that of the present address.

Returning to the step 20, since an expected address obtained from the previous execution of the subroutine is stored in the expected address memory, the address AM being reproduced is read in a step 21. The reproduced address AM and the expected address AN stored in the expected address memory are compared, and it is then judged in a step 23 whether or not the absolute value of the difference between the reproduced address AM and the expected address AN is less than a prescribed value AR. Judgement in the step 23 that the absolute value of the difference is less than the prescribed value AR means that the expected address substantially corresponds to the reproduced address, that is, it is judged that a recording track jump has not occurred from the time since the subroutine was previously executed. Steps 29 and 30 are then executed so that the address (last address) reproduced and the next expected address, which is determined on the basis of the reproduced address, are rewritten in each memory area.

When it is judged in the step 23 that the absolute value of the difference between the address AM being reproduced and the expected address AN is equal to or greater than the prescribed value AR, the pickup is judged to be located at a position distant from the expected address, that is, it is judged that a recording track jump has occurred from the time the subroutine was previously executed. It is then checked in a step 24 whether or not the CD region reproduction flag is "1", whereby it is determined whether the region being reproduced is the CD region or the video region. The execution of the step 24 is necessary because different correction methods are used in case of tracking jumping in the two different regions.

First, when it is judged in the step 24 that the region being reproduced is the CD region, the system controller 21 causes the pickup to be moved toward the expected address stored in the expected address memory in a step 25. Subsequently, it is continuously monitored in a step 26 whether or not the address being reproduced corresponds to the expected address, and the step 26 is repeatedly executed until the position of the pickup corresponds to the expected address. When the address being reproduced corresponds to the expected address, then the address being reproduced at this time (that is, the reproduced address corresponds to the expected address stored in the expected address memory) is written in the present address memory, and subsequently the expected address which is forecast from the present address is written in the expected address memory in a step 30. As a result, if the recording track is jumped during the reproduction of the CD region, reproduction is resumed from the expected address stored in the expected address memory immediately before the jumping of the recording track, and the CD region is not reproduced between the expected address and the present address (that is, last address) stored immediately before the jumping of the recording track. However, since the difference between the two addresses is extremely small, the listener will not notice the gap in reproduction at all. If the recording track is jumped due to data dropout or the like, reproduction is resumed except for the dropout region.

On the contrary, during the reproduction of the video region, the pickup 3 is moved in a step 27 toward a last address, and is continuously moved until the address of the pickup corresponds to the last address in a step 28. As a result, if the recording track is jumped during the reproduction of the video region, reproduction is resumed from the last address reached immediately before the jumping of the recording track so that reproduction can be performed continuously from the last video frame reproduced immediately before the jumping of the recording track because it is important to continuously reproduce the video region. Interruption of video reproduction is generally much more noticeable that a corresponding interruption of audio reproduction.

In the reproduction method provided in accordance with the present invention, the difference between a present address detected from reproduced information and an expected address renewed at a prescribed period is monitored. When the difference has become equal to or greater than a prescribed value, the information detecting point is judged to have jumped the recording track, whereupon the information detecting point is moved to an expected address corresponding to the last address read during the reproduction of the CD region of the disk, or is moved to the last address read during the reproduction of the video region of the disk. For that reason, reproduction in accordance with the present invention is resistant and stable against external vibration acting on the player. Therefore, the inventive reproduction method is very useful for a disk player installed in a motor vehicle in which the information detecting point is likely to jump the recording track due to vibration or the like.

What is claimed is:

1. A reproduction method for a disk player capable of reproducing an information recording disk having a first region in which only a prescribed digital signal is recorded and a second region in which a video signal subjected to frequency modulation and a prescribed digital signal are recorded in a superposed state, comprising the steps of:

monitoring a difference between a present address detected from reproduced information and an expected address renewed at a prescribed period;

when said difference becomes equal to or greater than a prescribed value, judging that an information detecting point has jumped the recording track of said disk, and moving said information detecting point to a specified reproduction start point, wherein when judging that an information detecting point has jumped, differentiating a reproduction start position according to one of the first and second regions being reproduced, further wherein said step of moving said information detecting point comprises the steps of:

determining whether said first region or said second region is being reproduced;

if said first region is being reproduced, moving said information detecting point to said specified reproduction start point at an address corresponding to a value of said expected address; and if said second region is being reproduced, moving said information detecting point to said specified reproduction start point at a last address read before it was judged that said information detecting point has jumped said recording track.

2. The reproduction method of claim 1, wherein said expected address is calculated by determining how many recording tracks will ordinarily be crossed within a predetermined time period.

3. The reproduction method of claim 2, wherein said predetermined time period corresponds to a repetition rate for executing said method.

* * * * *